(12) United States Patent
Alvanos

(10) Patent No.: US 10,240,471 B2
(45) Date of Patent: Mar. 26, 2019

(54) SERRATED OUTER SURFACE FOR VORTEX INITIATION WITHIN THE COMPRESSOR STAGE OF A GAS TURBINE

(71) Applicant: UNITED TECHNOLOGIES CORPORATION, Farmington, CT (US)

(72) Inventor: Ioannis Alvanos, West Springfield, MA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 416 days.

(21) Appl. No.: 14/767,728

(22) PCT Filed: Nov. 8, 2013

(86) PCT No.: PCT/US2013/069095
§ 371 (c)(1),
(2) Date: Aug. 13, 2015

(87) PCT Pub. No.: WO2014/158236
PCT Pub. Date: Oct. 2, 2014

(65) Prior Publication Data
US 2016/0010475 A1    Jan. 14, 2016

Related U.S. Application Data

(60) Provisional application No. 61/777,413, filed on Mar. 12, 2013.

(51) Int. Cl.
*F04D 29/68*    (2006.01)
*F04D 29/52*    (2006.01)
(Continued)

(52) U.S. Cl.
CPC .............. *F01D 11/001* (2013.01); *F01D 5/02* (2013.01); *F01D 9/041* (2013.01); *F01D 11/02* (2013.01);
(Continued)

(58) Field of Classification Search
CPC .... F04D 29/164; F04D 29/321; F04D 29/329; F04D 29/685; F01D 11/08; F01D 11/02; F01D 11/001
See application file for complete search history.

(56) References Cited

U.S. PATENT DOCUMENTS 1,651,855 A * 12/1927 Warren .................... F01D 11/02
277/413
3,411,794 A * 11/1968 Allen ..................... F01D 11/001
277/414
(Continued)

FOREIGN PATENT DOCUMENTS

| EP | 0292250 A1 * 11/1988 | ............... C21D 1/09 |
| EP | 1937979 B1    6/2010 | |
| GB | 2092681 A * 8/1982 | .............. F01D 11/08 |

OTHER PUBLICATIONS

International Search Report Application No. PCT/US2013/069095; dated Feb. 26, 2014.
(Continued)

*Primary Examiner* — Todd E Manahan
*Assistant Examiner* — Eric Linderman
(74) *Attorney, Agent, or Firm* — Cantor Colburn LLP

(57) ABSTRACT

An axial flow compressor is disclosed with a plurality of rotors. Each rotor includes a disk having an outer rim. Each outer rim is coupled to a radially outwardly extending rotor blade. The case is coupled to a plurality of radially inwardly extending stator vanes, i.e. cantilever-type stator vanes. Each stator vane is disposed between two rotor blades and extends towards one of the outer rims and terminates at a tip (Continued)

disposed in close proximity to one of the outer rims. At least one of the outer rims includes a serrated outer surface that faces the tip of a stator vane which results in a vortex flow causing air that would normally leak through the clearance between the stator vane and the outer rim to engage the stator vane to a greater degree thereby increasing the efficiency of the compressor.

13 Claims, 3 Drawing Sheets

(51) Int. Cl.
| | |
|---|---|
| F01D 11/08 | (2006.01) |
| F04D 29/16 | (2006.01) |
| F01D 11/12 | (2006.01) |
| F01D 11/00 | (2006.01) |
| F01D 11/02 | (2006.01) |
| F04D 29/32 | (2006.01) |
| F01D 5/02 | (2006.01) |
| F01D 9/04 | (2006.01) |
| F01D 25/24 | (2006.01) |
| F02C 3/06 | (2006.01) |
| F02C 3/14 | (2006.01) |

(52) U.S. Cl.
CPC ............... *F01D 25/24* (2013.01); *F02C 3/06* (2013.01); *F02C 3/14* (2013.01); *F04D 29/164* (2013.01); *F04D 29/321* (2013.01); *F04D 29/329* (2013.01); *F04D 29/685* (2013.01); *F01D 11/08* (2013.01); *F01D 11/122* (2013.01); *F04D 29/526* (2013.01); *F05D 2220/32* (2013.01); *F05D 2240/12* (2013.01); *F05D 2250/294* (2013.01); *F05D 2250/61* (2013.01)

(56) References Cited

U.S. PATENT DOCUMENTS

| | | | | |
|---|---|---|---|---|
| 3,719,365 A * | 3/1973 | Emmerson | ............... | F01D 11/12 277/414 |
| 4,086,022 A * | 4/1978 | Freeman | ............... | F01D 11/08 415/119 |
| 4,239,452 A * | 12/1980 | Roberts, Jr. | ............... | F01D 11/12 415/173.5 |
| 4,466,772 A * | 8/1984 | Okapuu | ............... | F01D 11/08 415/171.1 |
| 4,714,406 A * | 12/1987 | Hough | ............... | F01D 11/08 415/173.1 |
| 4,767,266 A | 8/1988 | Holz et al. | | |
| 4,930,729 A * | 6/1990 | Savill | ............... | B63B 1/34 138/37 |
| 5,137,419 A * | 8/1992 | Waterman | ............... | F04D 29/685 415/170.1 |
| 5,217,348 A * | 6/1993 | Rup, Jr. | ............... | F01D 11/001 415/115 |
| 5,520,508 A * | 5/1996 | Khalid | ............... | F01D 11/08 415/119 |
| 5,707,206 A * | 1/1998 | Goto | ............... | F01D 11/10 415/173.1 |
| 5,950,308 A | 9/1999 | Koff et al. | | |
| 6,220,012 B1 * | 4/2001 | Hauser | ............... | F01D 5/145 60/772 |
| 6,231,301 B1 * | 5/2001 | Barnett | ............... | F04D 27/02 415/119 |
| 6,234,747 B1 * | 5/2001 | Mielke | ............... | F01D 11/08 415/119 |
| 6,499,940 B2 * | 12/2002 | Adams | ............... | F01D 11/08 415/121.2 |
| 6,514,039 B1 * | 2/2003 | Hand | ............... | B23K 26/0069 29/889.21 |
| 6,589,600 B1 * | 7/2003 | Hasz | ............... | B22C 9/10 427/264 |
| 6,830,428 B2 * | 12/2004 | Le Biez | ............... | F01D 5/20 415/173.4 |
| 7,338,251 B2 * | 3/2008 | Ro | ............... | F04D 29/162 415/173.1 |
| 7,658,592 B1 * | 2/2010 | Jarrah | ............... | F04D 29/526 415/119 |
| 7,871,244 B2 * | 1/2011 | Marini | ............... | F01D 11/122 415/173.4 |
| 8,038,388 B2 * | 10/2011 | Freling | ............... | F01D 11/001 415/174.4 |
| 8,382,422 B2 * | 2/2013 | Guemmer | ............... | F04D 29/526 415/58.5 |
| 8,770,926 B2 * | 7/2014 | Guo | ............... | C23C 4/18 415/173.4 |
| 8,770,927 B2 * | 7/2014 | Strock | ............... | F01D 11/122 415/173.4 |
| 8,777,558 B2 * | 7/2014 | Brunet | ............... | F04D 29/164 415/173.1 |
| 8,939,705 B1 * | 1/2015 | Lee | ............... | F01D 11/122 415/1 |
| 8,939,706 B1 * | 1/2015 | Lee | ............... | F01D 11/122 415/1 |
| 8,939,707 B1 * | 1/2015 | Lee | ............... | F01D 11/122 415/1 |
| 8,939,716 B1 * | 1/2015 | Lee | ............... | F01D 11/122 415/173.1 |
| 9,151,175 B2 * | 10/2015 | Tham | ............... | F01D 11/122 |
| 9,243,511 B2 * | 1/2016 | Lee | ............... | F01D 11/122 |
| 10,066,640 B2 * | 9/2018 | Bennington | ............... | F04D 29/526 |
| 2002/0131858 A1 * | 9/2002 | Adams | ............... | F01D 11/08 415/9 |
| 2003/0138317 A1 * | 7/2003 | Barnett | ............... | F04D 27/02 415/57.4 |
| 2003/0175116 A1 * | 9/2003 | Le Biez | ............... | F01D 5/20 415/173.4 |
| 2007/0147989 A1 * | 6/2007 | Collins | ............... | F01D 11/02 415/173.1 |
| 2007/0160459 A1 * | 7/2007 | Tudor | ............... | F04D 29/526 415/119 |
| 2007/0196204 A1 * | 8/2007 | Seitz | ............... | F01D 11/08 415/144 |
| 2007/0212217 A1 * | 9/2007 | Northfield | ............... | F04D 29/164 415/200 |
| 2008/0044273 A1 * | 2/2008 | Khalid | ............... | F04D 29/164 415/57.4 |
| 2008/0080972 A1 * | 4/2008 | Bunker | ............... | F01D 5/225 415/174.5 |
| 2008/0206040 A1 * | 8/2008 | Seitz | ............... | F01D 5/145 415/57.3 |
| 2008/0219835 A1 * | 9/2008 | Freling | ............... | F01D 11/001 415/173.4 |
| 2009/0041576 A1 * | 2/2009 | Guemmer | ............... | F04D 29/526 415/149.4 |
| 2009/0160135 A1 * | 6/2009 | Turini | ............... | F01D 11/02 277/418 |
| 2009/0246007 A1 * | 10/2009 | Johann | ............... | F04D 29/685 415/182.1 |
| 2010/0014956 A1 * | 1/2010 | Guemmer | ............... | F04D 29/526 415/9 |
| 2010/0098536 A1 * | 4/2010 | Guemmer | ............... | F04D 29/164 415/208.1 |
| 2010/0310353 A1 * | 12/2010 | Yu | ............... | F01D 11/122 415/1 |
| 2010/0329852 A1 * | 12/2010 | Brignole | ............... | F04D 29/526 415/159 |
| 2011/0311354 A1 * | 12/2011 | Goswami | ............... | F01D 11/08 415/182.1 |
| 2012/0003085 A1 * | 1/2012 | Agneray | ............... | F04D 27/0207 415/199.5 |
| 2012/0201671 A1 * | 8/2012 | Shahpar | ............... | F01D 11/08 415/220 |

(56) References Cited

U.S. PATENT DOCUMENTS

| | | | | |
|---|---|---|---|---|
| 2015/0078890 A1* | 3/2015 | Obrecht | ............... | F04D 29/164 |
| | | | | 415/191 |
| 2015/0240652 A1* | 8/2015 | Lee | ..................... | F01D 11/122 |
| | | | | 415/1 |
| 2015/0337672 A1* | 11/2015 | McCaffrey | ............. | F01D 11/08 |
| | | | | 415/173.1 |
| 2015/0369071 A1* | 12/2015 | Alvanos | ............... | F04D 29/164 |
| | | | | 415/1 |
| 2016/0061050 A1* | 3/2016 | Keenan | ................ | F01D 11/122 |
| | | | | 415/118 |
| 2016/0153465 A1* | 6/2016 | Yoon | ..................... | F04D 29/526 |
| | | | | 60/805 |
| 2016/0222973 A1* | 8/2016 | Reynolds | ............... | F04D 27/02 |
| 2016/0230776 A1* | 8/2016 | Bennington | ......... | F04D 29/526 |
| 2017/0204876 A1* | 7/2017 | Veitch | .................. | F04D 29/526 |
| 2017/0328377 A1* | 11/2017 | Mallina | ................ | F04D 29/526 |
| 2017/0370241 A1* | 12/2017 | Tham | ................... | F01D 11/122 |

OTHER PUBLICATIONS

Supplementary European Search Report for Application No. EP 13 88 0304.

* cited by examiner

SERRATED OUTER SURFACE FOR VORTEX INITIATION WITHIN THE COMPRESSOR STAGE OF A GAS TURBINE

CROSS-REFERENCE TO RELATED APPLICATION

This patent application is a US National Stage under 35 U.S.C. § 371, claiming priority to International Application No. PCT/US13/069095 filed on Nov. 8, 2013, which claims priority under 35 U.S.C. § 119(e) to U.S. patent application Ser. No. 61/777,413 filed on Mar. 12, 2013.

TECHNICAL FIELD

This disclosure relates to gas turbine engines and, more specifically, to compressors of gas turbine engines. The disclosed compressors reduce leakage between a cantilevered stator vane and an outer rim of a rotating disk.

BACKGROUND

A sectional view of a gas turbine engine 10 of the turbo fan type is shown in FIG. 1. While not shown, the engine 10 may also be a geared turbofan engine. The engine 10 includes a nacelle 11 that surrounds the fan 12. The fan 12 may be connected to a nose 13 for aerodynamic purposes and, as the fan 12 rotates, it generates two primary air flows including a bypass airflow indicated by the arrow 14 and that flows between the nacelle 11 and the engine case 15 which serves as a housing for the primary engine components. The fan 12 also helps to generate an air flow that passes through the engine case 15 as indicated by the arrow 16. A low-pressure compressor 17 is disposed aft of the fan 12 and is coupled to a low-pressure turbine 18 by the shaft 21. A high-pressure compressor 22 is disposed aft of the low-pressure compressor 17 and forward of the combustor 23. The combustor 23 is disposed between the high-pressure compressor 22 and the high-pressure turbine 24. The high-pressure turbine 24 and the high-pressure compressor 22 are coupled together by the outer shaft 25.

Air enters the engine 10 via the fan 12 before being compressed by the low-pressure compressor 17 and before being compressed again by the high-pressure compressor 22 before being combusted in the combustor 23. The combustion gasses then rotate the high-pressure turbine 24 and low-pressure turbine 18 (which drive the high-pressure compressor 22 and low-pressure compressor 17 respectively) before exiting the engine 10 through the nozzle 26.

One primary problem associated with gas turbine engines 10 is leakage, especially in the compressors 17, 22. For example, a high-pressure compressor 22 is illustrated in FIG. 2. The high-pressure compressor 22 is surrounded by the case 15 and includes a plurality of rotors 27-32. Each rotor 27-32 includes a disk 33-38. Each disk 33-38 may include a radially inwardly end 39-44 which may serve as a hub for connecting the disks 33-38 to the shaft 25 (see FIG. 1). Each disk 33-38 may also include a radially outward end 45-50. The radially outward ends 45-50 are typically coupled to rotor blades 51-56. The rotor blades include distal tips 57-62 which are disclosed in close proximity to interior surfaces of the case 15. The clearance between the rotor blade tips 57-62 and the interior surfaces of the case 15 are one source of leakage in such a high-pressure compressor. Another source of leakage involves the stators 63-67 which are coupled to the case 15 as well as shrouds 68-72. As shown in FIG. 2, the shrouds 68-72 may be of a fixed dimension (see the shrouds 70, 71 and 72) or the shrouds may be variable (see the shrouds 68, 69). Either way, clearance between the variable stators 63, 64 and the rotors 27, 28 and clearance between the non-variable stators 65-67 and the rotors 29-32 is another source of leakage.

The compressor 22 of FIG. 2 includes stators 63-67 of the shrouded type. Turning to FIG. 3, another high-pressure compressor 122 is disclosed with "cantilevered" stator 163-167. The reader will note that the cantilevered stators 163-167 are secured to the case 115 and are not physically connected to nor engaging the rotors 127-131. Instead, there is clearance between the radially inwardly directed tips 76-79 and the radially outward ends 145, 147, 149 of the rotors 127, 129, 131. The clearances between the tips 76-79 and the radially outward ends 145, 147, 149 of the rotors 127, 129, 131 are another source of leakage for the compressor 122.

The negative impacts of such leakage between rotor blades and the case or between stator vanes and the hubs are well documented. An increase in the rotor tip clearance leakage leads to a reduction in stage pressure rise, efficiency and flow range. For example, rotor blades with normal operating clearances generate a 1.5% reduction in efficiency for every 1% increase in the clearance to blade-height ratio. Such leakage also increases the stall margin. Similar effects are caused by leakage at the stator vane tip, whether the stator vanes are of the shrouded type as shown in FIG. 2 or of the cantilevered type shown in FIG. 3. Another option that is not shown in FIG. 2 or 3 is to employ an abradable rub system which is expensive, prone to wear or deterioration and therefore results in a loss in effectiveness.

Therefore, there is a need for an improved stator vane design which minimizes leakage and forces more air flow to pass across the body of the stator vane.

SUMMARY

In one aspect, an axial flow compressor is disclosed which includes a plurality of rotors coaxially disposed within a case and coupled together. Each rotor includes a disk having a radially outward end that includes an outer rim. Each outer rim is coupled to a radially outwardly extending rotor blade. Each radially outwardly extending rotor blade terminates at a tip. The case is also coupled to a plurality of radially inwardly extending stator vanes. Each stator vane may be disposed between two rotor blades and may extend towards one of the outer rims before terminating at a tip disposed in close proximity to one of the outer rims. At least one of the outer rims includes a serrated outer surface that faces the tip of one of the stator vanes.

In another aspect, a high-pressure compressor for a gas turbine engine is disclosed. The compressor may include a plurality of rotors coaxially disposed within a case. Each rotor may include a disk having a radially inward end that includes a hub and a radially outward end that includes an outer rim. Each outer rim may be coupled to at least one radially outwardly extending rotor blade and each outer rim may also be coupled to at least one other outer rim of at least one adjacent disk. Each radially outwardly extending rotor blade may terminate at a tip disposed in close proximity with an interior surface of the case. The case may be coupled to a plurality of radially inwardly extending stator vanes. Each stator vane may be disposed between two rotor blades and may extend towards one of the outer rims before terminating at a tip disposed in close proximity to one of the outer rims. A plurality of the outer rims may include a serrated outer surface that faces the tip of one of the stator vanes. The serrated outer surfaces may each include a plurality of coaxial and adjacent groves spaced apart by coaxial lands.

And yet in another aspect, a gas turbine engine is disclosed. The engine may include a high-pressure compressor disposed between a low-pressure compressor and a combustor. The high-pressure compressor may be coaxially coupled to a high-pressure turbine for rotation with the high-pressure turbine. The high-pressure compressor may include a plurality of rotors coaxially disposed within the case. Each rotor may include a disk having a radially inward end and a radially outward end that includes an outer rim. Each outer rim may be coupled to a radially outwardly extending rotor blade and at least one other outer rim of at least one adjacent disk. Each radially outwardly extending rotor blade may terminate at a tip disposed in close proximity with an interior surface of the case. The case may be coupled to a plurality of radially inwardly extending stator vanes. Each stator vane may be disposed between two rotor blades and may extend toward one of the outer rims and may further terminate at a tip disposed in close proximity to one of the outer rims. A plurality of the outer rims may include a serrated outer surface wherein each serrated outer surface faces a tip of one of the stator vanes.

In any one or more of the aspects described above, the serrated outer surface may include a plurality of adjacent grooves.

In any one or more of the aspects described above, the serrated outer surface may include a plurality of coaxial grooves separated by lands with each land disposed between two grooves. The grooves may be defined by a bottom surface disposed between two sidewalls. The side walls may be slanted in the fore direction. In a further refinement of this concept, the lands may be flat.

In any one or more of the aspects described above, the stator vane that faces the serrated outer surface has a width. Further, the serrated outer surface also has a width, however, the width of the serrated outer surface may be smaller than the width of the stator vane that faces the serrated outer surface.

In any one or more of the aspects described above, the tip of the stator vane that faces the serrated outer surface may be free of an abradable coating.

In any one or more of the aspects described above, at least one outer rim includes two serrated outer surfaces disposed on either side of a rotor blade. The rotor blade may be disposed axially between two stator vanes with each of the two stator blades being in alignment with one of the two serrated outer surfaces.

In any one or more of the aspects described above, at least one outer rim may not include a serrated outer surface and may be disposed between and coupled to two outer rims that each include at least one serrated outer surface.

In any one or more of the embodiments described above, the compressor may be a high-pressure compressor of a gas turbine engine that also includes a low-pressure compressor.

DESCRIPTION

Figure 1:
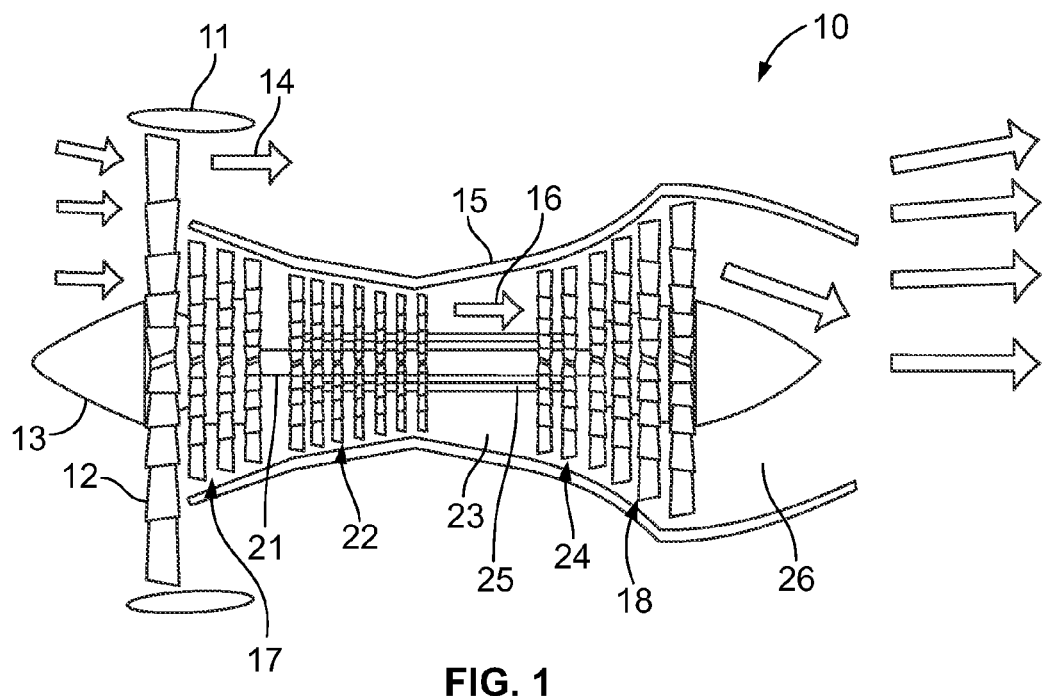
FIG. 1 is a sectional view of a prior art turbofan gas turbine engine.
Figure 4:
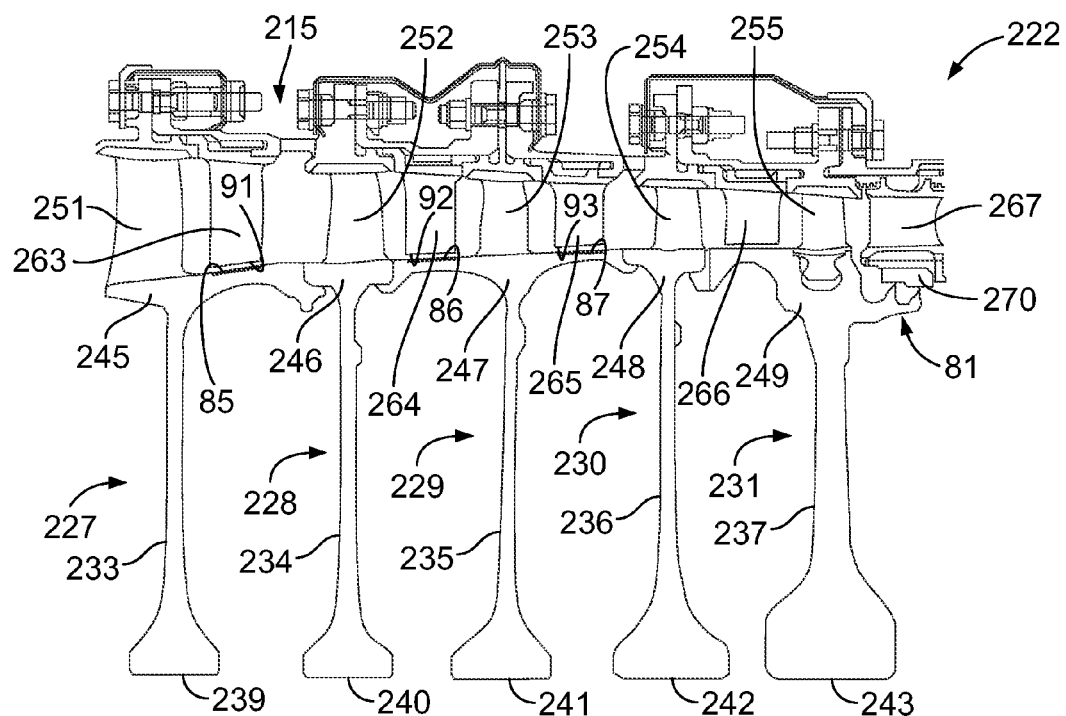
FIG. 4 is a sectional view of a disclosed high-pressure compressor.
Figure 5:
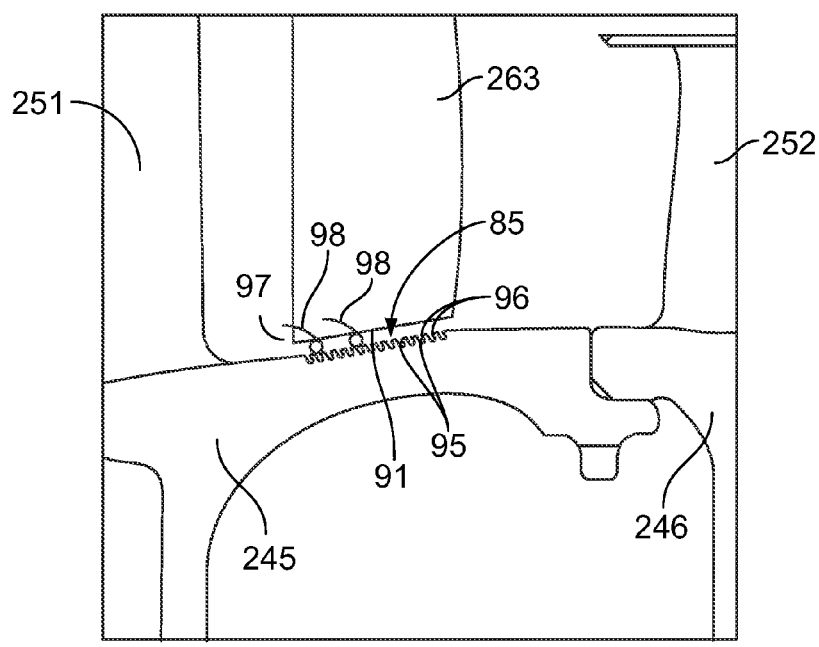
FIG. 5 is an enlarged and partial sectional view of the high-pressure compressor shown in FIG. 4.

Turning to FIGS. 4 and 5, a disclosed high-pressure, and axial-flow compressor 222 is shown in a sectional view and that also includes the plurality of rotors 227-231. Each rotor includes a disk 233-237. Each disk 233-237 includes a radially inward end 239-243, that may serve as a hub for coupling the disk 233-237 and the high-pressure compressor 222 to a shaft 25 like that shown in FIG. 1. Each disk 233-237 also includes a radially outward end 245-249. Each radially outward end 245-249 may be coupled to a rotor blade 251-255. The rotor blades 251-254 may be integrally connected to their respective disks 233-236 while the rotor blade 255 of the last stage may be connected to the disk 237 by way of a dovetail connection. The rotor 231 also serves as a final stage to the high-pressure compressor 222 and therefore includes a seal mechanism 81 to keep the compressed air from leaking radially inwardly before it reaches the combustor 23 (see FIG. 1). The case 215 is coupled to a plurality of stator vanes 263-266 that are of the cantilever-type, or in other words, stators that are suspended from the case 215 and extend radially inward towards the disks 233-236. An additional shrouded stator 267 is coupled to the case 215 and the shroud 270 which engages the seal 81.

Referring to the stators 263, 264 and 265 and to FIGS. 4-5, the stator vanes 263, 264, 265 extend radially inwardly towards serrated surfaces 85-87. The serrated surface 85 that is disposed in close proximity to the distal tip 91 of the stator vane 263 is more clearly illustrated in FIG. 5. It will be noted that the relationship between the serrated surface 85 and the distal tip 91 of the stator vane 263 is analogous to the relationships between the serrated surfaces 86, 87 and the distal tips 92, 93 of the stator vanes 264, 265 respectively. Each serrated surface 85-87 includes a plurality of grooves 95 disposed between lands 96. As shown in FIG. 5, the grooves 95 are defined by opposing sidewalls that terminate in a land 96 and the grooves 95 are slanted in the fore direction. As compressed air is traveling through the high-pressure compressor 222 in the aft direction, any leakage in the clearance 97 between the stator vane 263 and the serrated surface 85 will create multiple vortices shown schematically at 98 in FIG. 5. The multiple vortices 98 act to force the majority of the gas pass flow to pass the body of the stator 263 as opposed to passing along the distal tip 91. As a result, the effective clearance is tighter than the physical clearance 97 thereby increasing the efficiency of the stator vane 263 and the high-pressure compressor 222. The high-pressure compressor 222 may include a plurality of serrated surfaces 85-87 thereby decreasing efficiency losses caused by clearances between the stator vanes 263, 264, 265 and the radially outward ends 245 and 247.

Figure 2:
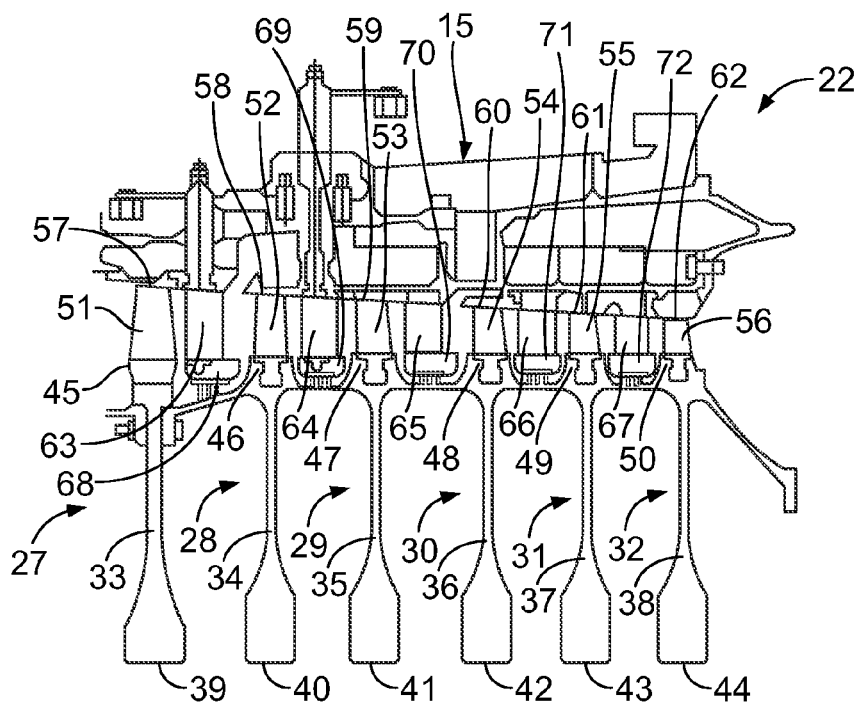
FIG. 2 is a sectional view of a prior art high-pressure compressor that may be utilized in the gas turbine engine shown in FIG. 1.
Figure 3:
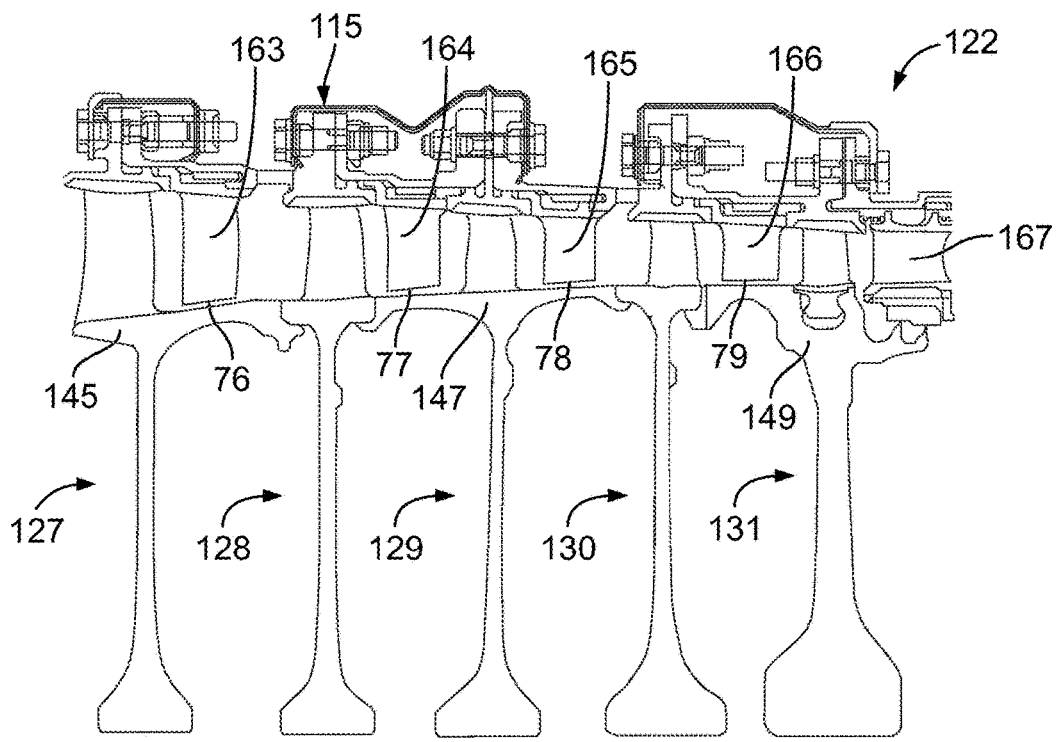
FIG. 3 is a sectional view of another prior art high-pressure compressor that may be utilized in the gas turbine engine of FIG. 1.
Figure 6:
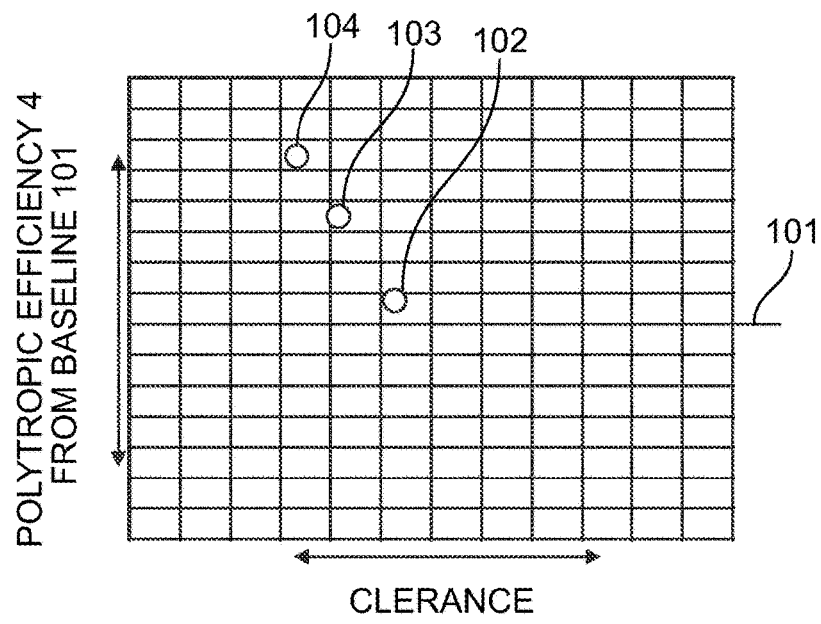
FIG. 6 illustrates, graphically, a comparison of efficiency versus clearance for prior art cantilever stator vane with a rub system early in the life cycle of the rub system, a cantilever stator vane without a rub system and the disclosed cantilever stator operating with the serrated outer rim that creates the vortex flow across the body of the stator vane.

A non-dimensional comparison of three different stator vane styles is shown in FIG. 6. The line 101 represents a baseline efficiency for shrouded stator vanes, like that shown in FIG. 2. The data point 102 represents a cantilevered stator vane without abradable material on its distal tip so the stator vane does not rub up against the disk. The data point 103 represents the disclosed stator vane that is of a cantilever-type that has clearance between it and its respective disk that includes a serrated surface in alignment with the distal tip of the stator vane. The data point 103 represents a substantially increased efficiency for the disclosed stator vanes/serrated surfaces in comparison to the data point 102 and the baseline 101 which represents typical shrouded stator vanes. The data point 104 represents a cantilever-type stator with abradable material at its distal tip so that it engages its respective disk. While the data point 104 represents an increase in efficiency over the data point 103, the abradable material that rubs against the disk must be replaced with relative frequency and therefore the data point 104 represents a stator vane that is substantially more costly to employ than the disclosed stator vanes of the data point 103.

INDUSTRIAL APPLICABILITY

A high-pressure compressor 222 is disclosed that includes a plurality of disks 233 and 235 that may include one or more serrated surfaces 85, 86, 87 that are in alignment with cantilever-type stator vanes 263, 264, 265. The serrated surfaces 85, 86, 87 create a vortex flow as air leaks between the distal tips 91, 92, 93 of the stator vanes 263, 264, 265. The vortex flow causes the air to rotate upward and engage the stator vanes 263, 264, 265 as opposed to passing through the clearance between the distal tips 91, 92, 93 and the radially outward ends 245, 247 of the disks 233, 235. While the high-pressure compressor 222 utilizes only three such serrated surfaces 85, 86, 87 that are in alignment with three stator vanes 263, 264, 265, more or fewer stator vanes/serrated surface combinations may be employed. The vortex flow caused by the serrated surfaces 85, 86, 87 causes more air to engage the stator vanes 263, 264, 265 as opposed to merely passing along the clearance between the distal tips 91, 92, 93 of the stator vanes 263, 264, 265 and the radially outward surfaces 244, 247 of the disks 233, 235. Hence, efficiency is improved without resorting to the use of an abradable material disposed on the distal tips 91, 92, 93 of the stator vanes 263, 264, 265. By avoiding the use of such abradable rub material, maintenance is reduced and the efficiencies between the disclosed serrated surface/stator vane distal tip combination and stator vanes with abradable rub material disposed on their distal tips is comparable, even when the abradable rub material is early in its life cycle. Thus, an efficient high-pressure compressor 222 is disclosed that is more efficient than many existing designs, maintains is efficiency longer than other existing designs and is cheaper to operate due to the reduced maintenance.

The invention claimed is:

1. An axial flow compressor, comprising:
a plurality of rotors coaxially disposed within a case and coupled together, each rotor including a disk having a radially outward end that includes an outer rim, each outer rim is coupled to a plurality of radially outwardly extending rotor blades, each of the plurality of radially outwardly extending rotor blades terminating at a tip;
the case being coupled to a plurality of radially inwardly extending stator vanes, each stator vane extending towards one of the outer rims and terminating at a tip spaced from one of the outer rims;
at least one outer rim including a serrated outer surface that faces the tip of one of the plurality of radially inwardly extending stator vanes, wherein the serrated outer surface includes a plurality of coaxial grooves separated by lands with each land being flat and disposed between two grooves of the plurality of coaxial grooves, the two grooves of the plurality of coaxial grooves each being defined by a bottom surface area extending between two opposing side walls, the two opposing sidewalls extending simultaneously and axially from the bottom surface area in a direction towards air that is traveling into the axial flow compressor and radially outward from a radial inward end of the disk such that as air is traveling through the axial flow compressor in an aft direction leakage in a clearance between the one of the plurality of radially inwardly extending stator vanes and the serrated surface will create multiple vortices that force gases to flow past a body of the one of the plurality of radially inwardly extending stator vanes as opposed to passing along the tip of the one of the plurality of radially inwardly extending stator vanes.

2. The compressor of claim 1 wherein the serrated outer surface includes a plurality of adjacent grooves.

3. The compressor of claim 1 wherein the one of the plurality of radially inwardly extending stator vanes that faces the serrated outer surface has a width and the serrated outer surface has a width that is smaller than the width of the one of the plurality of radially inwardly extending stator vanes that faces the serrated outer surface.

4. The compressor of claim 1 wherein the tip of the one of the plurality of radially inwardly extending stator vanes that faces the serrated outer surface is free of an abradable coating.

5. The compressor of claim 1 wherein the at least one outer rim includes two serrated outer surfaces disposed on either side of a rotor blade of the plurality of radially outwardly extending rotor blades, the rotor blade of the plurality of radially outwardly extending rotor blades being disposed axially between two stator blades of the plurality of radially inwardly extending stator blades, each of the two stator blades of the plurality of radially inwardly extending stator blades being in alignment with one of the two serrated outer surfaces.

6. The compressor of claim 1 wherein the at least one outer rim does not include a serrated outer surface and is disposed between and coupled to two outer rims that each include at least one serrated outer surface.

7. The compressor of claim 1 wherein the compressor is a high-pressure compressor of a gas turbine engine that also includes a low-pressure compressor.

8. A compressor for a gas turbine engine, the compressor comprising:
a plurality of rotors coaxially disposed within a case, each rotor including a disk having a radially inward end that includes a hub and a radially outward end that includes an outer rim, each outer rim is coupled to at least one radially outwardly extending rotor blade and each outer rim is also coupled to at least one other outer rim of at least one adjacent disk, each radially outwardly extending rotor blade terminating at a tip disposed proximate to an interior surface of the case;
the case being coupled to a plurality of radially inwardly extending stator vanes, each of the plurality of radially inwardly extending stator vanes extending towards one of the outer rims and terminating at a tip spaced from one of the outer rims;
a plurality of the outer rims including a serrated outer surface, each serrated outer surface facing the tip of one of the stator vanes; and
the serrated outer surfaces each including a plurality of coaxial grooves separated by lands with each land being flat and disposed between two grooves of the plurality of coaxial grooves, the two grooves of the plurality of coaxial grooves each being defined by a bottom surface area extending between two opposing side walls, the two opposing sidewalls extending simultaneously and axially from the bottom surface area in a direction towards air that is travelling into the axially flow compressor and radially outward the radial inward end of the disk such that as air is traveling through the compressor in an aft direction leakage in a clearance between each serrated surface and a respective one of the plurality of radially inwardly extending stator vanes will create multiple vortices that force gases to flow past a body of the respective one of the plurality of radially inward extending stator vanes as opposed to passing along the tip of the respective one of the plurality of radially inward extending stator vanes.

9. The compressor of claim 8 wherein the plurality of radially inward extending stator vanes that face the serrated outer surfaces have widths and the serrated outer surfaces have widths that are smaller than the widths of the plurality of radially inward extending stator vanes that face the serrated outer surfaces.

10. The compressor of claim 8 wherein the tips of the plurality of radially inward extending stator vanes that face the serrated outer surfaces are free of an abradable coating.

11. A gas turbine engine, comprising:
a high-pressure compressor disposed between a low-pressure compressor and a combustor, the high-pressure compressor being coaxially coupled to a high-pressure turbine for rotation with the high-pressure turbine;
the high-pressure compressor including a plurality of rotors coaxially disposed within a case, each rotor including a disk having a radially inward end and a radially outward end that includes an outer rim, each outer rim is coupled to a radially outwardly extending rotor blade and to at least one other outer rim of at least one adjacent disk, each radially outwardly extending rotor blade terminating at a tip spaced from an interior surface of the case;
the case being coupled to a plurality of radially inwardly extending stator vanes, each of the plurality of radially inwardly extending stator vanes extending towards one of the outer rims and terminating at a tip spaced from one of the outer rims;
a plurality of the outer rims each including a serrated outer surface, each serrated outer surface facing the tip of one of the stator vanes each serrated outer surface including a plurality of coaxial grooves separated by lands with each land being flat and disposed between two grooves of the plurality of coaxial grooves, the two grooves of the plurality of coaxial grooves each being defined by a bottom surface area extending between two opposing side walls, the two opposing sidewalls extending simultaneously and axially from the bottom surface area in a direction towards air that is travelling into the axially flow compressor and radially outward from a radial inward end of the disk such that as air is traveling through the high-pressure compressor in an aft direction leakage in a clearance between each serrated outer surface facing the tip of one of the plurality of radially inwardly extending stator vanes will create multiple vortices that force gases to flow past a body of the one of the plurality of radially inwardly extending stator vanes as opposed to passing along the tip of the one of the plurality of radially inwardly extending stator vanes.

12. The engine of claim 11 wherein each one of the plurality of radially inwardly extending stator vanes that faces one of the serrated outer surfaces has a width and each serrated outer surface has a width that is smaller than the width of a one of the plurality of radially inwardly extending stator vanes that faces the serrated outer surface.

13. The engine of claim 11 wherein the tips of the plurality of radially inwardly extending stator vanes that face the serrated outer surfaces are free of abradable coatings.

* * * * *